United States Patent [19]
Bruckert et al.

[11] Patent Number: 6,094,428
[45] Date of Patent: *Jul. 25, 2000

[54] METHOD AND APPARATUS FOR TRANSMISSION AND RECEPTION OF A TRANSMISSION RATE IN A CDMA COMMUNICATION SYSTEM

[75] Inventors: Eugene J. Bruckert, Arlington Heights, Ill.; Thomas A. Sexton, Fort Worth, Tex.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/846,767

[22] Filed: Apr. 30, 1997

[51] Int. Cl.[7] .................................................. H04J 13/00
[52] U.S. Cl. ............................................................ 370/335
[58] Field of Search .................................. 370/335, 342, 370/347, 320, 441, 442, 465, 503, 535, 537, 346, 358, 391, 395, 479, 506, 509, 510, 511, 512, 513, 514, 538, 543, 206, 208, 318; 375/200, 530, 219, 206, 220, 295, 300, 316, 320, 358, 365, 130, 140, 145, 150, 239, 242, 265; 714/746, 752, 758, 751, 762

[56] References Cited

U.S. PATENT DOCUMENTS

| | | | |
|---|---|---|---|
| 5,267,244 | 11/1993 | Messerschmitt et al. | 370/342 |
| 5,329,547 | 7/1994 | Ling et al. | 370/342 |
| 5,465,269 | 11/1995 | Schaffner et al. | 375/200 |
| 5,528,593 | 6/1996 | English et al. | 370/391 |
| 5,544,156 | 8/1996 | Teder et al. | 370/342 |
| 5,629,934 | 5/1997 | Ghosh et al. | 370/335 |
| 5,673,266 | 9/1997 | Li | 370/465 |
| 5,751,725 | 5/1998 | Chen | 375/200 |
| 5,841,806 | 11/1998 | Gilhousen et al. | 375/206 |
| 5,881,053 | 3/1999 | Kimball | 370/260 |
| 5,949,790 | 9/1999 | Pehkonen et al. | 370/465 |

FOREIGN PATENT DOCUMENTS

WO95/34154  12/1995  WIPO.

OTHER PUBLICATIONS

"Near Maximum Likelihood Demodulation for M-ary Orthogonal Signalling", Walton and Wallce, GTE Laboratories Incorporated, pp. 5–8, 1993.

Primary Examiner—Dang Ton
Attorney, Agent, or Firm—Kenneth A. Haas

[57] ABSTRACT

In a communication system where a continuous reverse channel transmission is utilized by redundant transmission of Walsh codes, a current transmission rate is modulated onto Walsh code polarity. In particular, a remote unit operating at a particular transmission rate utilizing a continuous reverse channel transmission modulates the transmission rate by setting the polarity of each Walsh code depending upon the current or future data traffic channel rate. In communication systems where a Reference Coherent (RC) type transmission is utilized, the particular transmission rate is modulated onto the reference symbols (501–517) by setting the reference symbols (501–517) equal to a binary "1" or "0".

16 Claims, 7 Drawing Sheets

METHOD AND APPARATUS FOR TRANSMISSION AND RECEPTION OF A TRANSMISSION RATE IN A CDMA COMMUNICATION SYSTEM

FIELD OF THE INVENTION

The present invention relates generally to CDMA (Code Division Multiple Access) communication systems, and more particularly, to transmission and reception of a transmission rate for CDMA communication systems.

BACKGROUND OF THE INVENTION

Current communication between communication units within a Code Division Multiple Access (CDMA) communication system is described in detail in TIA/EIA Interim Standard IS-95A, Mobile Station-Base Station Compatibility Standards for Dual-Mode Wideband Spread Spectrum Cellular Systems, Telecommunications Industry Association, Washington, D.C. July 1993 (IS-95A) which is incorporated by reference herein. As described in IS-95A, when a reverse channel transmission rate is utilized which is less than the full rate, a discontinuous (burst type) signal is transmitted. This signal is divided into logical frames which are 20 ms (milliseconds) in length, with each frame being transmitted at a particular transmission rate. The frames are further divided into 16 smaller portions (or slots) which are referred to as power control groups. The base station demodulator estimates the energy of each power control group received from the remote unit. If the energy is above a threshold ($E_s$) then the base station will send back a power control signal directing the remote unit to reduce its transmit power. If the energy is below $E_s$, the power control signal will direct the remote unit to increase its transmit power.

A problem arises in the transmission rates that are not full rate, such as quarter rate. Presently, a quarter rate transmission will only transmit in a quarter, or four, of the power control groups within a frame. There will be nothing transmitted in the remaining twelve power control groups within the frame. However, the energy of the power control groups that are not used is still measured and compared to $E_s$. This measurement results in the transmission of a power control signal from the base site to the remote unit. Currently it is up to the remote unit to keep track of which power control groups were used and to ignore power control commands that result from the energy measurement of power control groups that were not used.

A solution to this problem is described in U.S. Pat. No. (Ser. No. 08/491,336, now Pat. No. 5,629,934) POWER CONTROL FOR CDMA COMMUNICATION SYSTEMS by Ghosh et al., and U.S. Pat. No. 5,528,593 METHOD AND APPARATUS FOR CONTROLLING POWER IN A VARIABLE RATE COMMUNICATION SYSTEM by English et al. As described in Ghosh et al. and English et al., a continuous reverse channel transmission scheme is utilized for sub-rate transmission in place of IS-95A burst-type transmission. Although such continuous transmission will eliminate the need for the remote unit to ignore certain power control commands, continuous reverse channel transmission requires alternate methods for determining the transmission rate of a remote unit utilizing such a method of transmission. Therefore, a need exists for a method and apparatus for transmitting and receiving a transmission rate of a remote unit in a CDMA communication system utilizing continuous reverse channel transmission.

DETAILED DESCRIPTION OF THE DRAWINGS

Stated generally, in a communication system where a continuous reverse channel transmission is utilized by redundant transmission of Walsh codes, a current transmission rate is modulated onto a low-rate control channel. In particular, a remote unit operating at a particular transmission rate utilizing a continuous reverse channel transmission scheme modulates the transmission rate by either setting the polarity of each Walsh code depending upon the current or future data traffic channel rate, or, in communication systems where a Reference Coherent (RC) type transmission is utilized, modulates the reference symbols by setting the reference symbols equal to a binary "1" or "0". By creating such a low-rate control channel indicating the current transmission rate, a continuous reverse channel transmission scheme can be utilized for sub-rate transmission in place of IS-95A burst-type transmission.

The present invention encompasses a method for transmitting a transmission rate in a multi-rate communication system where a continuous transmission scheme is utilized for sub-rate transmission. In particular, the transmission scheme utilizes frames for transmitting data, where each of the frames is transmitted at a particular transmission rate. The method comprises the steps of determining a transmission rate for a number of frames to be transmitted between a first communication unit and a second communication unit and then transmitting the number of frames from the first communication unit to the second communication unit along with a low-rate control channel indicating the transmission rate for the number of frames. In the preferred embodiment the low-rate control channel is modulated onto a normally transmitted channel and, as mentioned above, is utilized to indicate the transmission rate for the number of frames.

In a first embodiment of the present invention the low-rate control channel is created by modulating the transmission rate for the frames onto a polarity of spreading codes. In particular, a remote unit operating at a particular transmission rate utilizing a continuous reverse channel transmission scheme modulates the transmission rate by setting the polarity (or phase) of each Walsh code depending upon the current or future data traffic channel rate. In a second embodiment of the present invention, where a Reference Coherent transmission scheme is utilized (i.e., reference symbols are interspersed among the interleaved data symbols) the particular transmission rate is modulated onto the reference symbols by setting the reference symbols equal to a binary "1" or "0".

Although the above, described invention illustrates transmission of a low-rate control channel indicating a current transmission rate, the present invention additionally encompasses reception, and subsequent decoding of the transmitted low-rate control channel. In particular, a method for determining a transmission rate in a multi-rate communication system is provided, where a continuous transmission scheme is utilized for sub-rate reverse-channel transmission. The transmission scheme utilizes frames for transmitting data where each of the frames is transmitted at a particular transmission rate. The method comprises the steps of receiving a number of frames from a first communication unit along with a low-rate control channel, where as discussed above, the low-rate control channel is modulated onto a normally transmitted channel and is utilized to indicate the transmission rate for the number of frames. A transmission rate is determined for the number of frames from the low-rate control channel.

As discussed above, in a first embodiment the low-rate control channel is received with the low-rate control channel formed by modulating the transmission rate onto a polarity of a number of spreading codes and in a second embodiment the low-rate control channel is modulated onto the reference symbols by setting the reference symbols equal to a binary "1" or "0".

In order to transmit such a low-rate control channel according to the first embodiment of the present invention, the present invention provides for an apparatus for transmitting a transmission rate in a multi-rate communication system where a continuous transmission scheme is utilized for sub-rate transmission. The apparatus includes an encoder having data as an input and outputting the transmission rate for a number of frames to be transmitted between a first communication unit and a second communication unit. The apparatus additionally includes an instantaneous traffic channel gain computer having the number of frames and the transmission rate as inputs and outputting a number of frames with the transmission rate modulated thereon by spreading the number of frames with either a spreading code or its inverse such that a sequence of spread data is utilized to indicate the transmission rate. The apparatus additionally includes a transmitter having as an input, the number of frames with the transmission rate modulated thereon, and transmitting the number of frames from the first communication unit to the second communication unit.

In order to transmit such a low-rate control channel according to the second embodiment of the present invention (i.e., utilizing RC type transmission), the present invention provides for an apparatus for transmitting a transmission rate in a multi-rate communication system where a continuous transmission scheme is utilized for sub-rate transmission. The apparatus includes an encoder having data as an input and outputs the transmission rate for a number of frames to be transmitted between a first communication unit and a second communication unit, and an instantaneous traffic channel gain computer having the number of frames and the transmission rate as inputs and outputs a number of frames with reference symbols interspersed among interleaved frames, the reference symbols additionally having the transmission rate modulated thereon by varying the reference symbols such that a sequence of reference symbols is utilized to indicate the transmission rate. Finally, the apparatus includes a transmitter having as an input, the number of frames with the transmission rate modulated thereon, and transmitting the number of frames from the first communication unit to the second communication unit.

In order to receive such a low-rate control channel according to the first embodiment of the present invention, the present invention provides for an apparatus for receiving a transmission rate in a multi-rate communication system where a continuous transmission scheme is utilized for sub-rate reverse-channel transmission. The apparatus includes a receiver having as an input, a number of frames with the transmission rate modulated thereon such that the number of frames are spread with either a spreading code or its inverse to produce a sequence of spread data, where the sequence of spread data is utilized to indicate the transmission rate, the receiver additionally outputs the number of frames. The apparatus also includes a rate computer having the frames as an input and outputting the transmission rate.

In order to receive such a low-rate control channel according to the second embodiment of the present invention, the present invention provides for an apparatus for receiving a transmission rate in a multi-rate communication system where a continuous transmission scheme is utilized for sub-rate reverse-channel transmission. The apparatus includes a receiver having as an input, a number of interleaved frames with the transmission rate modulated thereon such that the frames include reference symbols interspersed among the frames, the reference symbols additionally having the transmission rate modulated thereon by varying the reference symbols such that a sequence of reference symbols is utilized to indicate the transmission rate, the receiver having as an output, the number of frames. The apparatus additionally includes a rate computer having the number of frames as an input and outputting the transmission rate.

Figure 1:
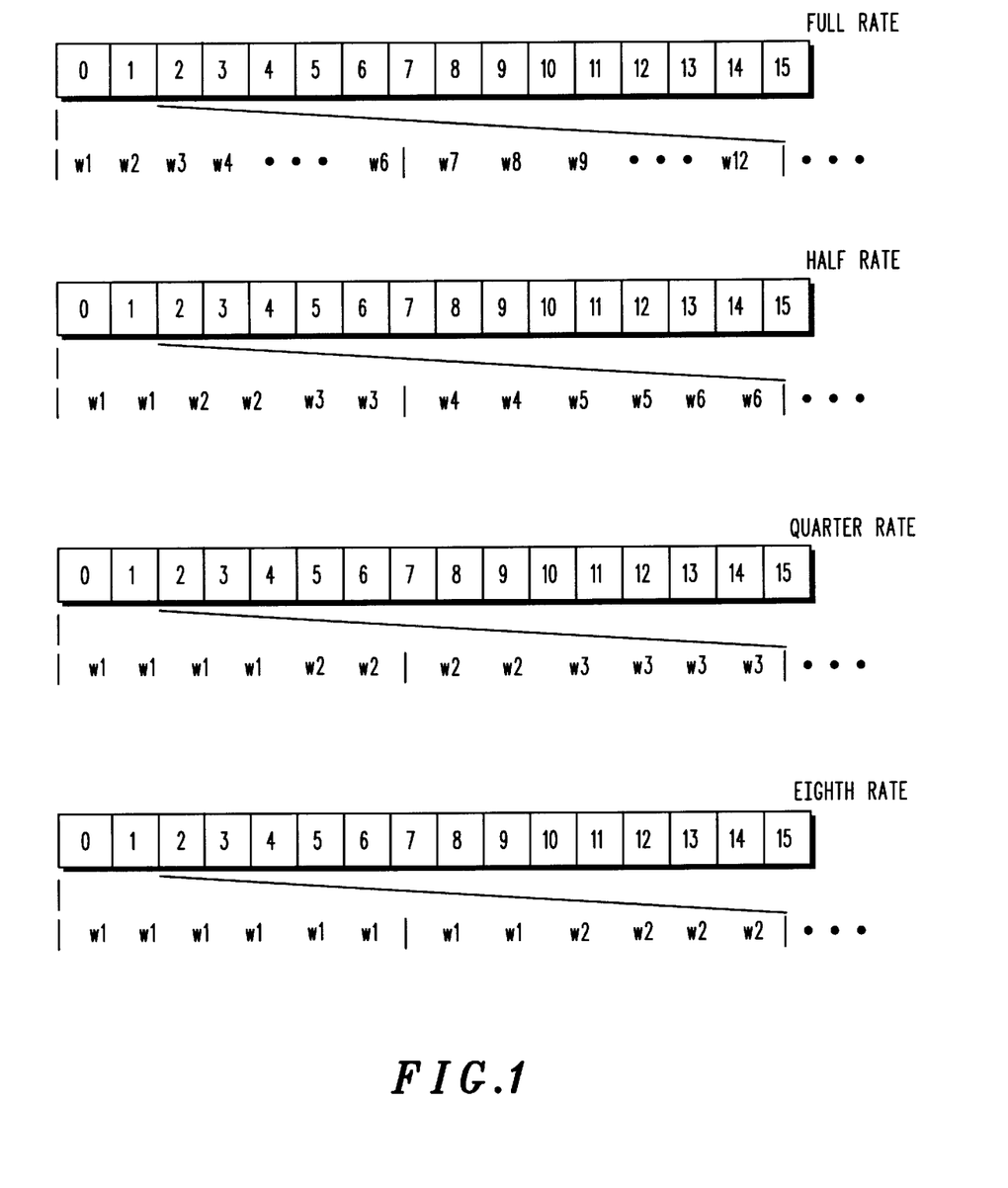
FIG. 1 illustrates transmission of power control groups at various rates as used by the present invention.

FIG. 1 illustrates IS-95A-type transmission of power control groups at various rates as used by the present invention. As is evident, the preferred embodiment of the present invention utilizes every power control group (PCG) for all transmission rates. This is accomplished by redundant transmission of Walsh codes associated with each PCG. For example, as discussed above, each frame transmitted is divided up into 16 PCGs, which in turn comprise six Walsh codes. During full rate transmission all six Walsh codes in each PCG are transmitted only once (as described in IS-95A). During sub-rate transmission, the Walsh codes are immediately repeated. For example, during half-rate transmission, each Walsh code is simultaneously transmitted twice, while quarter-rate and eighth-rate frames simultaneously transmit each Walsh code four and eight times respectively. As shown in FIG. 1, the result of simultaneously repeating Walsh codes in such a way is to make the Walsh code more quickly available for demodulation and rate estimation. Additionally, repeating Walsh codes in such a way provides time diversity which is utilized by the receiver to increase quality, and thus reduce the power of the transmitted PCGs. In the preferred embodiment of the present invention the transmitted power is reduced by 3 dB for each halving of the transmission rate. For example, the transmit power at half-rate transmission is half of that at full rate. Because of Walsh code repetition, this results in no change in the amount of overall energy per bit transmitted into the system.

Figure 2:
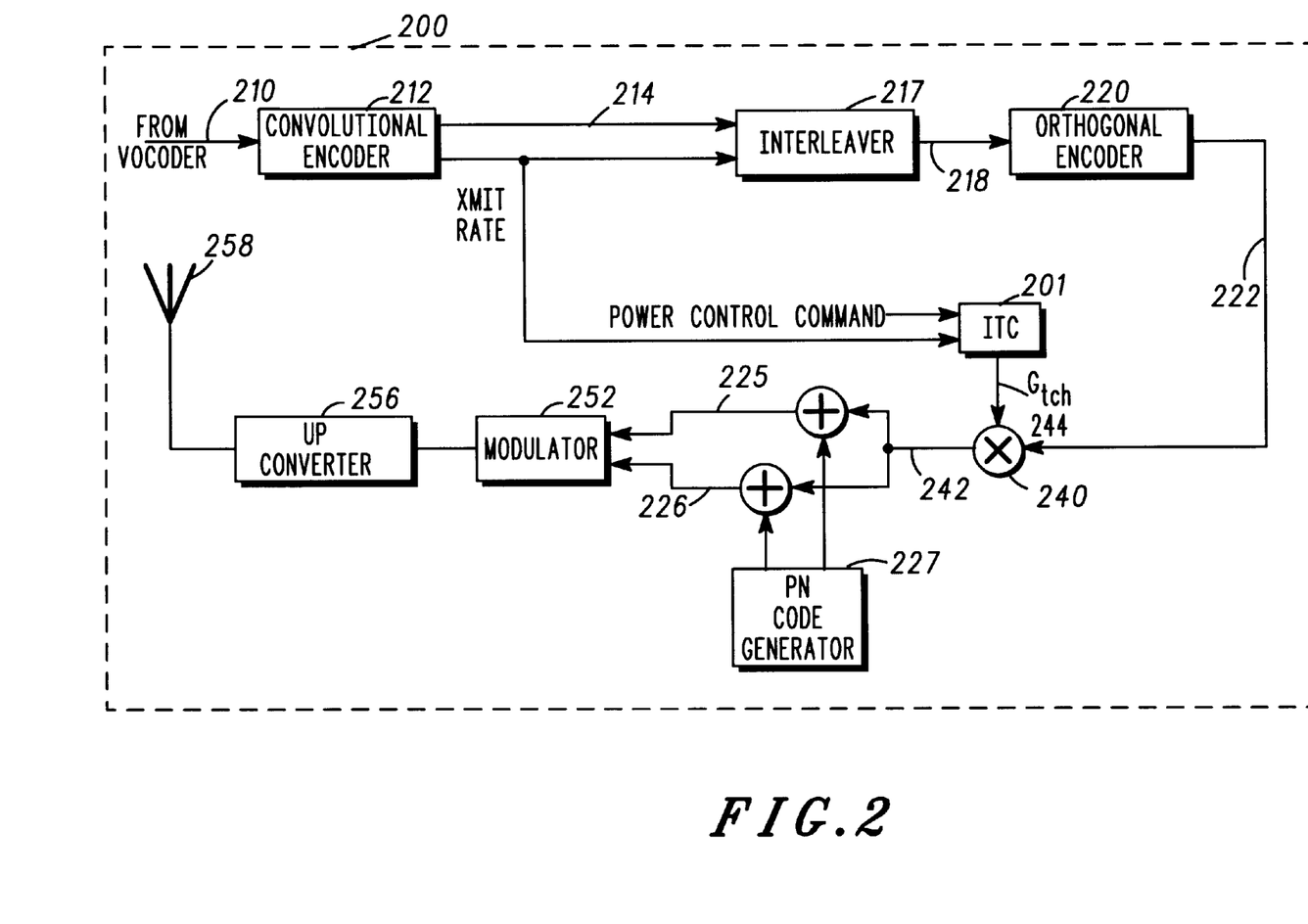
FIG. 2 is a block diagram of a remote unit transmitter in accordance with the preferred embodiment of the present invention.

Referring now to FIG. 2, a block diagram of a CDMA reverse channel transmitter, housed within communication unit 200, is illustrated which utilizes the present invention. Transmitter 200 includes convolutional encoder 212, interleaver 217, orthogonal encoder 220, modulator 252, upconverter 256, and instantaneous traffic channel gain computer (ITC) 201.

During operation, signal 210 (traffic channel data bits), is output by a voice encoder (vocoder) and is received by convolutional encoder 212 at a particular transmission rate (e.g., 9.6 kbit/second). Input traffic channel data bits 210 typically include voice converted to data by a vocoder, pure data, or a combination of the two types of data, and is output at a particular data rate (i.e., full rate, ½ rate, ¼ rate, ⅛ rate . . . etc.). Convolutional encoder 212 determines the transmission rate and encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 212 encodes input data bits 210 (received at a rate of 9.6 kbit/second) at a fixed encoding rate of one data bit to three data symbols (i.e., rate ⅓) such that convolutional encoder 212 outputs data symbols 214 at a 28.8 ksymbol/second rate.

Data symbols 214 are then input into interleaver 217. Interleaver 217 interleaves the data symbols 214 at the symbol level. In interleaver 217, data symbols 214 are individually input into locations within a matrix so that the matrix is filled in a column by column manner. Data symbols 214 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 218 are output by interleaver 217 at the same data symbol rate that they were input (e.g., 28.8 ksymbol/second). The predetermined size of the block of data symbols defined by the matrix is derived from the maximum number of data symbols which can be transmitted at a predetermined symbol rate within a predetermined length transmission block. For example, in a full rate transmission if the predetermined length of the transmission block is 20 milliseconds, then the predetermined size of the block of data symbols is 9.6 ksymbol/second times 20 milliseconds times three which equals 576 data symbols which defines a 24 by 24 matrix.

Interleaved data symbols 218 are input to orthogonal encoder 220.

For IS-95-type transmission orthogonal encoder 220 M-ary modulates the interleaved data symbols 218. For example, in 64-ary orthogonal encoding, each sequence of six interleaved data symbols 218 are replaced by a 64 symbol orthogonal code. These 64 orthogonal codes preferably correspond to Walsh codes from a 64 by 64 Hadamard matrix wherein a Walsh code is a single row or column of the matrix. Orthogonal encoder 220 repetitively outputs a Walsh code 222 a number of times dependent on the determined frame rate (as shown in FIG. 1).

ITC 201 updates traffic channel gain values Gtch 244 based upon power control commands received from a base station. Additionally, (as discussed below) in a first embodiment of the present invention where reference symbols are interspersed among the interleaved data symbols ITC 201 modulates the reference symbols to form a low-rate control channel. In a second embodiment of the present invention (discussed below) ITC 201 sets the polarity of Gtch 244 dependent upon the current or future data traffic channel rate (received from encoder 212). In other words, in the second embodiment of the present invention the polarity of Gtch is modulated to produce a low-rate control channel, modulated onto normally transmitted information (i.e., normally transmitted spreading (Walsh) codes) that indicates the current transmission rate. In the preferred embodiment of the present invention, the Walsh code and reference bit modulation is advanced by at least 25% into the previous frame in order to have a sufficient amount of time for the receiver 300 to decode and act upon the rate information encoded within the Walsh code. Gtch 244 is then output to multiplier 240, which multiplies Walsh code's 222 amplitude by gain value Gtch 244 resulting in a sequence of amplitude weighted and polarity modulated Walsh codes 242. A sequence of amplitude weighted and polarity modulated Walsh codes 242 is prepared for transmission over a communication channel by modulator 252. PN Generator 227 provides a spreading code which is combined with the output from multiplier 240. The spreading code is a specific sequence of symbols which is output at a fixed chip rate (e.g., 1.228 Mchip/second). In practice, the code spread encoded chips are a pair of pseudorandom (PN) codes used to generate an I-channel and Q-channel code spread sequence 226. The I-channel and Q-channel code spread sequences 226 are used to bi-phase modulate a quadrature pair of sinusoids by driving the power level controls of the pair of sinusoids. The sinusoids output signals are summed, bandpass filtered, translated to an RF frequency, amplified, filtered via upconverter 256 and radiated by antenna 258 to complete transmission of channel data bits 210.

Figure 3:
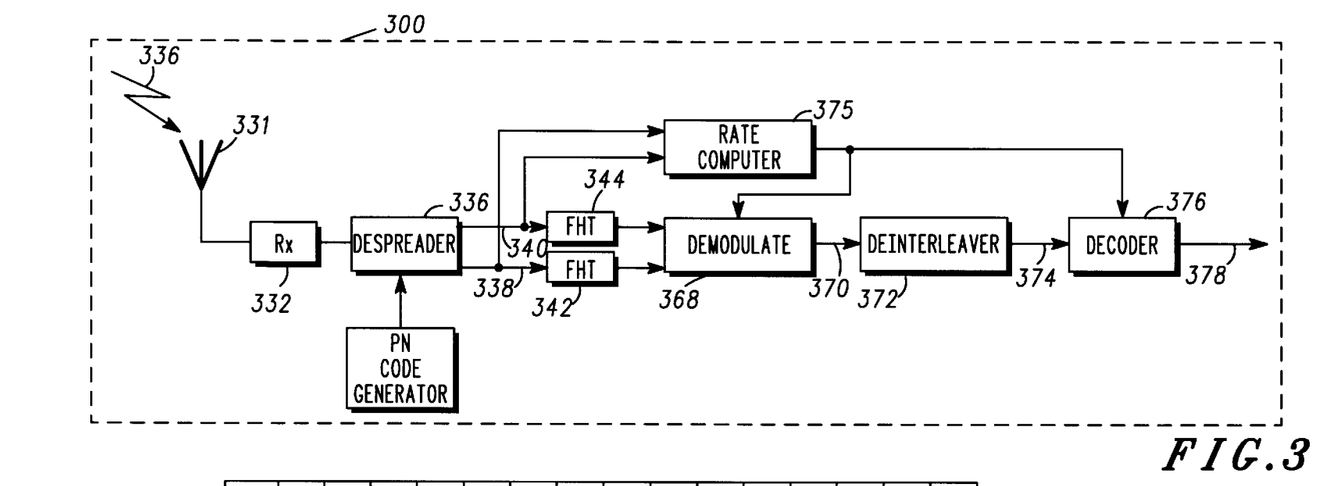
FIG. 3 is a block diagram of a base station receiver in accordance with the preferred embodiment of the present invention.

FIG. 3 is a block diagram of a CDMA base station receiver, housed within communication unit 300, for reception of variable-rate transmissions in accordance with the preferred embodiment of the present invention. Orthogonally encoded spread-spectrum digital signal 330 is received at receive antenna 331 and amplified by receiver 332 before being despread by despreader 336 into in-phase 340 and quadrature 338 components. Components 338, 340 of despread digital samples are then grouped into predetermined length groups (e.g., 64 sample length groups) of sampled signals that are independently input to orthogonal decoders in the form of fast Hadamard transformers 342, 344, which despread the orthogonally encoded signal components producing a plurality of despread signal components 346 and 360, respectively (e.g. when 64 sample length groups are input, then 64 despread signals are generated). In addition, each transformer output signal 346, 360 has an associated Walsh index symbol which identifies each particular orthogonal code from within a set of mutually orthogonal codes (e.g. when 64 sample length groups are input, then a 6 bit length index data symbol can be associated with the transformer output signal to indicate the particular 64 bit length orthogonal code to which the transformer output signal corresponds). Outputs 346 and 360 are then demodulated by demodulator 368. Demodulated data 370 is then deinterleaved by deinterleaver 372 prior to final maximum likelihood decoding by decoder 376.

In order for demodulator 368 and decoder 376 to properly operate, they must be supplied with the current transmission rate of the remote unit. The current transmission rate is necessary so that demodulator 368 and decoder 376 can take into consideration any repetition in Walsh code transmission. In the preferred embodiment of the present invention, rate computer 375 operates to supply demodulator 368 and decoder 376 with the proper transmission rate. Operation of rate computer 375 is described below.

In the preferred embodiment of the present invention, the remote unit may transmit utilizing two access methods dependent on whether an IS-95A-type transmission is utilized or whether a Reference Coherent (RC) type transmission is utilized. As described in U.S. Pat. No. 5,329,547, METHOD AND APPARATUS FOR COHERENT COMMUNICATION IN A SPREAD-SPECTRUM COMMUNICATION SYSTEM, by Ling, during RC type transmission, reference symbols are interspersed among the interleaved data symbols 218. These reference symbols are utilized for synchronization purposes and are inserted by interleaver 217 before orthogonal encoding. For example, as described by Ling, a binary "1" is inserted after every three consecutive interleaved data symbols. These reference symbols (and the interleaved data symbols) are then each multiplied by a Walsh code spreading sequence by orthogonal encoder 220, transmitted, and utilized by a receiver to help in synchronization. During operation of transmitter 200 in accordance with the preferred embodiment of the present invention, these reference symbols are modulated by ITC 201 to form a low-rate control channel, modulated onto a normally transmitted channel (i.e., the transmitted reference bits) that indicates the current transmission rate. Additionally, the reference bit modulation is advanced by at least 25% into the previous frame in order to have a sufficient amount of time for the receiver to decode and act upon the rate information encoded within the reference symbols. In other words, information regarding transmission rate of frame N is contained (at least) in the last quarter of frame N−1. A comparison between prior-art RC transmission, and RC transmission in accordance with the preferred embodiment is shown in FIG. 4 and FIG. 5.

Figure 4:
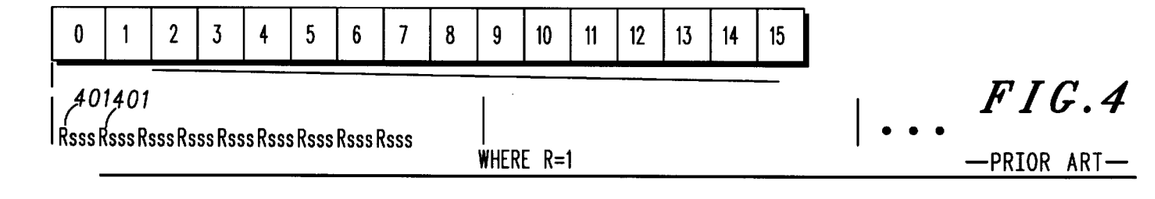
FIG. 4 illustrates insertion of reference symbols utilized for synchronization in prior-art Reference-Coherent type transmission.
Figure 5:
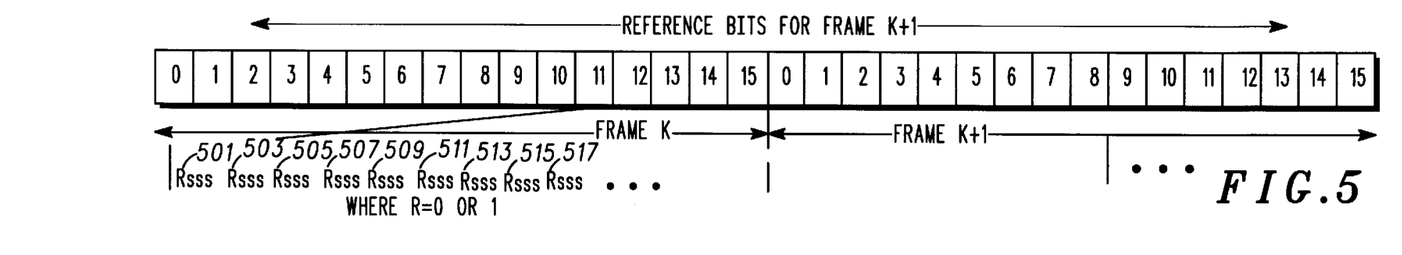
FIG. 5 illustrates insertion of reference symbols utilized for synchronization and rate determination in Reference-Coherent type transmission in accordance with the preferred embodiment of the present invention.

FIG. 4 illustrates insertion of reference symbols utilized for synchronization in prior-art Reference-Coherent type transmission. As discussed above, each power control group consists of forty-eight Walsh codes representing 36 encoded data symbols and 12 reference symbols. Prior-art RC transmission utilizes every fourth symbol as a reference bit 401, and inserts a binary "1" in every fourth symbol slot. As discussed above, the receiver utilizes the reference symbols 401 to help in synchronization. In the preferred embodiment of the present invention, the reference symbols are modulated and utilized as a low-rate (e.g., 2 bits of information every 20 ms) signaling channel to indicate the transmission rate. This is illustrated in FIG. 5 where the reference bit can be either a "1" or "0." Additionally, examination of FIG. 5 reveals that reference symbols 501–517 (equal to a binary "1" or "0") are utilized to indicate the transmission rate for frame K+1, and are advanced eight slots into the Kth frame. In the preferred embodiment of the present invention, the Walsh symbols replacing reference symbols 501–517 in encoder 220 are modulated by ITC 201 as follows:

For two level modulation that indicates change/no change (e.g., only full or eighth rate allowed):

| no change: | 101010 |
|---|---|
| change: | 111111. |

For three level modulation indicating increased rate, same rate, or lower rate (e.g., three rates allowed or more if rate jumps greater than one from frame to frame are disallowed):

| Increased rate: | 101010/101010 |
|---|---|
| same rate: | 111111/111111 |
| lower rate: | 110011/001100. |

For four level modulation indicating the exact rate:

| full rate: | 101010/101010 |
|---|---|
| ½ rate: | 111111/111111 |
| ¼ rate: | 110011/001100 |
| ⅛ rate: | 111100/001111 |

Figure 6:
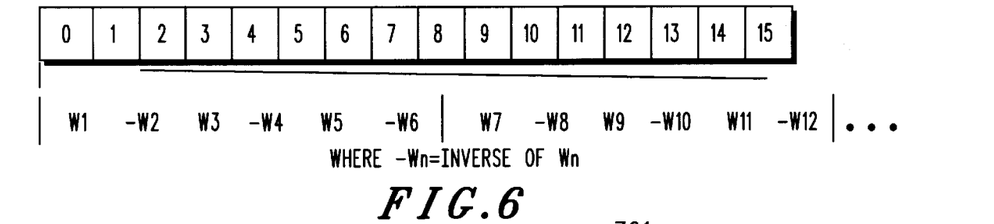
FIG. 6 illustrates Walsh Code modulation utilized for rate determination in accordance with a preferred embodiment of the present invention.

During IS-95A-type transmission, the current transmission rate is represented by encoded data symbols that are replaced six at a time by the 64 bit Walsh code represented by those six symbols. In the preferred embodiment of the present invention, modulation of the transmission rate is accomplished by replacing a Walsh code by its inverse. Such a modulation scheme is described in U.S. Pat. No. 5,465,269 METHOD AND APPARATUS FOR ENCODING AND DECODING A SUPPLEMENTARY SIGNAL by Schaffner et al. This type of modulation is illustrated in FIG. 6. As shown in FIG. 6, each Walsh code can be inverted, and the sequence of transmitted Walsh codes can be utilized to determine the transmission rate. Such a modulation scheme can be accomplished by modulating the Walsh codes as follows:

For two level modulation that indicates change/no change, (e. g., only full or eighth rate allowed) multiply phase of Walsh code in each PCG by:

| no change: | 101010 |
|---|---|
| change: | 111111. |

For three level modulation indicating increased rate, same rate, or lower rate, (e.g., three rates allowed or more if rate jumps greater than one from frame to frame are disallowed) multiply phase of Walsh code in each PCG pair by:

| increased rate: | 101010/101010 |
|---|---|
| same rate: | 111111/111111 |
| lower rate: | 110011/001100. |

For four level modulation indicating the exact rate, multiply phase of Walsh code in each PCG pair by:

| full rate: | 101010/101010 |
|---|---|
| ½ rate: | 111111/111111 |
| ¼ rate: | 110011/001100 |
| ⅛ rate: | 111100/001111, | where a 1 indicates no change in phase from previous symbol and a 0 inicates a 180° phase change. Thus, FIG. 6 illustrates the modulation of 101010/101010 on the first two power control groups of a frame. As discussed above, the modulation of Walsh codes are advanced by at least 25% into the previous frame in order to have a sufficient amount of time for the receiver to decode and act upon the rate information encoded within the reference symbols.

Figure 7:
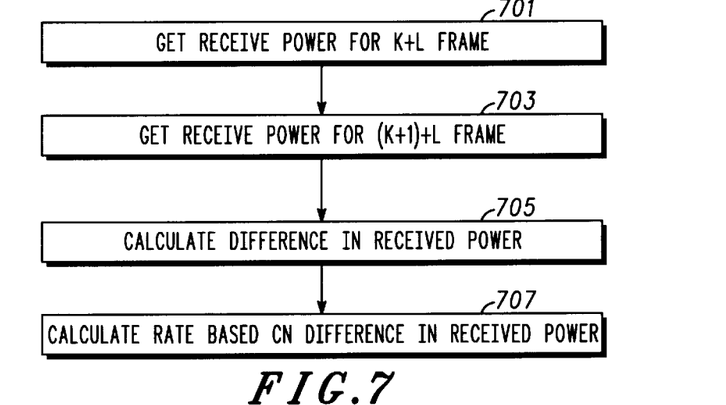
FIG. 7 is a flow chart showing operation of the rate computer of FIG. 3 in accordance with the preferred embodiment of the present invention.

Whether an IS-95A-type transmission or an RC-type transmission is used, in the preferred embodiment of the present invention, a power discontinuity at the frame boundary is analyzed to help in the determination of transmission rate. For example, as discussed above, the power is reduced by 3 dB for every halving of the transmission rate. In the preferred embodiment of the present invention rate computer 375 analyzes any increase or decrease in transmit power to help in the determination of transmission rate. FIG. 7 illustrates a preferred method of operating rate computer 375. At step 701 rate computer 375 analyzes the current power received for the last part of the Kth frame (e.g., the last PCG). At step 703, the received power is calculated for the first part of the (K+l)th frame (e.g., the first PCG). A difference in received power is then analyzed (step 705), and a rate is calculated based on the difference in received power. For example, an increase in received power by approximately 3 dB, indicates a strong possibility that the transmit rate was doubled. In other words, if the receiver is currently operating at half-rate, and rate computer 375 experiences a 3 dB jump in received power at the frame boundary, then there exists a strong possibility that the remote unit is now transmitting at full rate.

Figure 8:
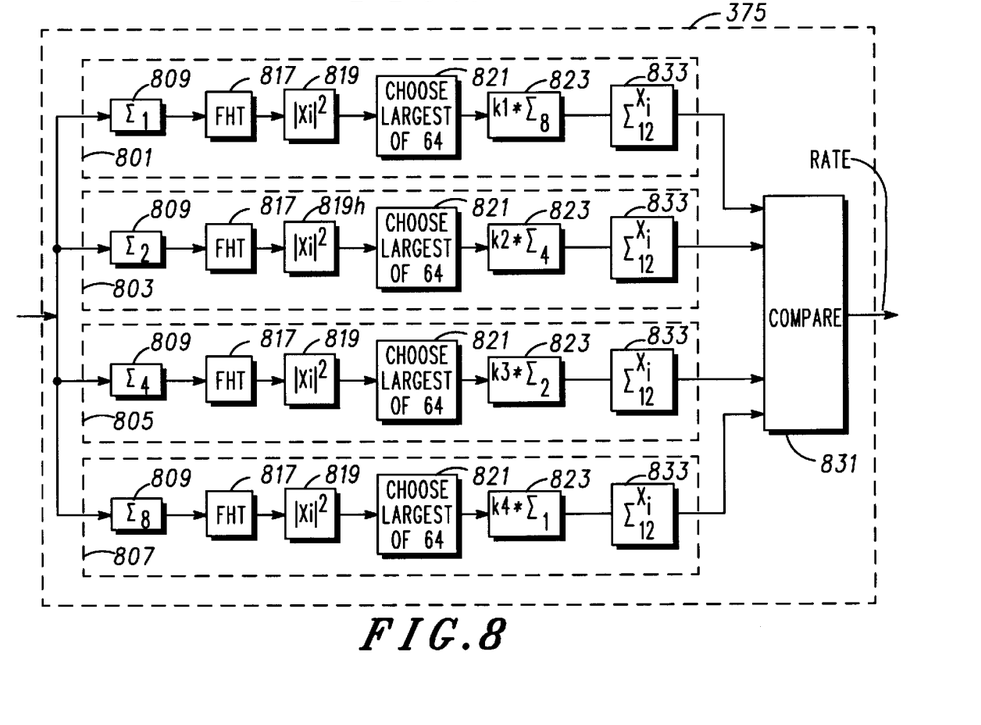
FIG. 8 is a block diagram of the rate computer of FIG. 3 in accordance with a first preferred embodiment of the present invention.

FIG. 8 is a block diagram of rate computer 375 of FIG. 3 in accordance with a first preferred embodiment of the present invention. In the first embodiment, rate computer 375 is utilized when M-ary Walsh modulation occurs utilizing a continuous reverse link transmission and the rate is determined by the amount of orthogonal symbol repetition. Operation of rate computer 375 in accordance with the first embodiment of the present invention occurs as follows: Complex samples of the 64 symbol orthogonal code enter rate computer 375 and are directed to four separate branches 801–807. In the preferred embodiment of the present invention there exists one branch for each possible transmission rate that outputs a level indicating the probability of that particular transmission rate. For example, as shown branch 801 outputs a level indicating the probability that full rate transmission is occurring, branch 803 outputs a level indicating a probability that half rate transmission is occurring, branch 805 outputs a level indicating a probability that quarter rate transmission is occurring, and branch 807 outputs a level indicating a probability that eighth rate transmission is occurring. Each branch has an appropriate complex (or vector) summing circuit 809–815 that complex sums N orthogonal symbols, where N=1, 2, 4, or 8, depending on branch 801–807 where complex summing circuit 809–815 is located.

The complex summed samples are passed to an appropriate FHT 817 where a transforming operation occurs. In particular, when 64 sample length groups are input, then 64 despread signals are generated. In addition, each transformer output signal has an associated Walsh index symbol which identifies each particular orthogonal code from within a set of mutually orthogonal codes (e.g., when 64 sample length groups are input, then a 6 bit length index data symbol can be associated with the transformer output signal to indicate the particular 64 bit length orthogonal code to which the transformer output signal corresponds). The output of FHT 817 is two 1×64 matrices that indicate a probability of any Walsh code being transmitted. These matrices are then element by element magnitude squared by circuitry 819 such that every element in each matrix is squared and then the two squared matrices are summed with each other to produce a single 1×64 matrix. Next, circuitry 821 chooses the largest element from the 1×64 matrix and passes this value on to the appropriate summing circuitry where, depending on the particular branch, N elements are summed (where N=8, 4, 2, or 1) and scaled. The scaled sum is passed to sum block 833 where it is added to the previous scaled sums of the frame. There are a total of 12 scaled sums per 20 ms frame. The resulting value and all intermediate values are passed to comparator 831 where a largest value from all branches 801–807 corresponds to the most likely transmission rate being utilized. For example, if the largest value is passed to comparator 831 from branch 801, then full rate transmission is occurring, and a value indicating full rate transmission is output from rate computer 375.

Figure 9:
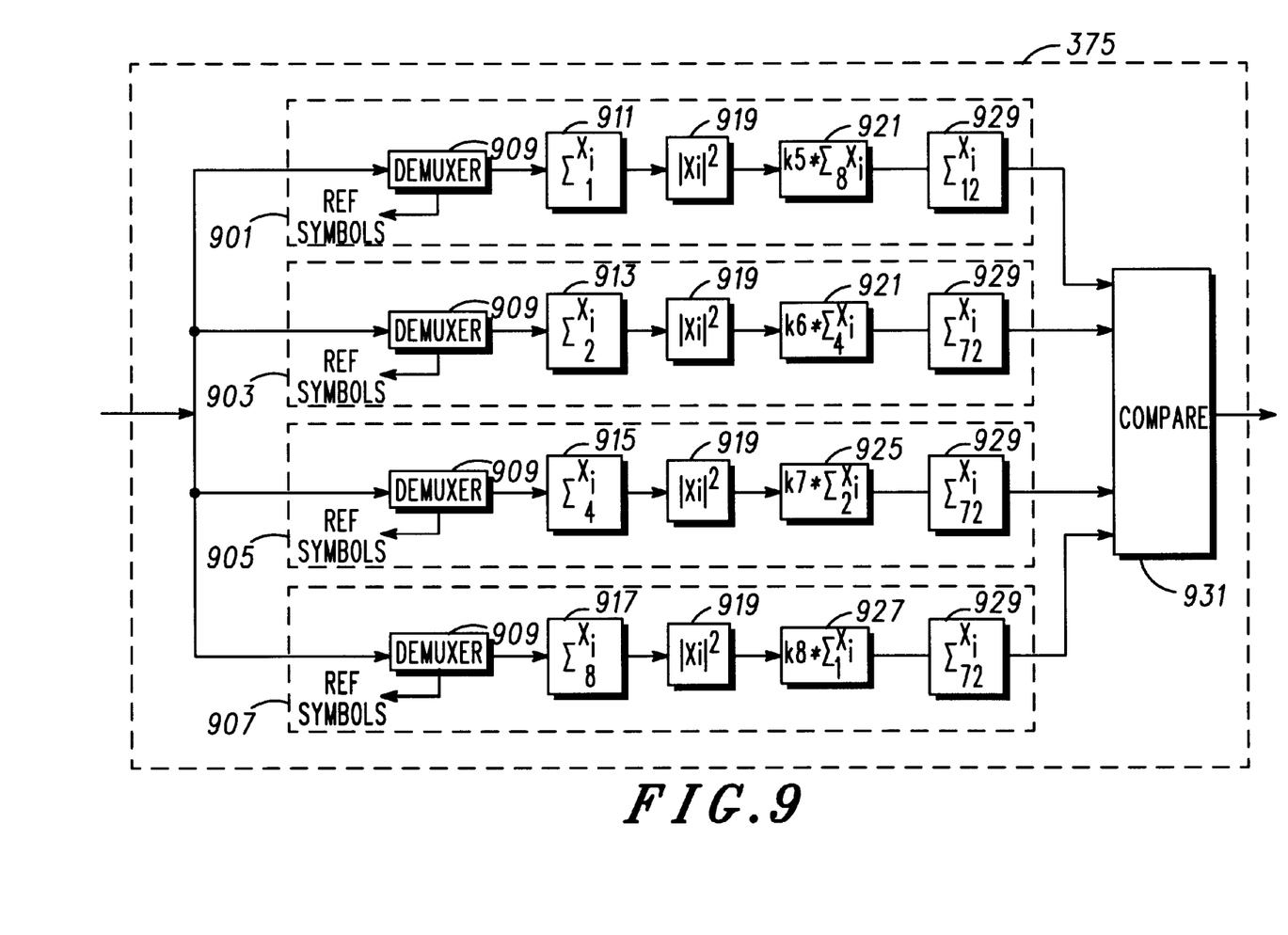
FIG. 9 is a block diagram of the rate computer of FIG. 3 in accordance with a second preferred embodiment of the present invention.

FIG. 9 is a block diagram of the rate computer of FIG. 3 in accordance with a second preferred embodiment of the present invention. In the second embodiment, rate computer 375 is utilized when an RC-type modulation occurs utilizing a continuous reverse link transmission and rate is determined by the amount of data symbol repetition. Operation of rate computer 375 in accordance with the second embodiment of the present invention occurs as follows: Despread data and reference complex symbol samples enter rate computer 375 and are directed to four separate branches 901–907. As discussed above, there exists one branch for each possible transmission rate that outputs a level indicating the probability of that particular transmission rate. The complex samples are demultiplexed by demultiplexer 909 where the reference symbols are stripped, from the data. Data is output from demultiplexer 909 and enters appropriate summing circuit 911–917. As discussed above, each branch has an appropriate summing circuit 911–917 that sums N samples, where N=1, 2, 4, or 8, depending on the branch 901–907 where summing circuit 911–917 is located.

The summed complex samples are then magnitude squared by circuitry 919 and passed to appropriate summer/scaler 921–927, where depending on the particular branch, N samples are summed (where N=8, 4, 2, 1) and scaled. The scaled sum is passed to sum block 929 where it is added to the previous scaled sums. There are a total of 72 scaled sums in a 20 ms frame. The resulting value and all intermediate values are passed to comparator 931 where (as discussed above) the largest value passed corresponds to the particular transmission rate being utilized.

Figure 10:
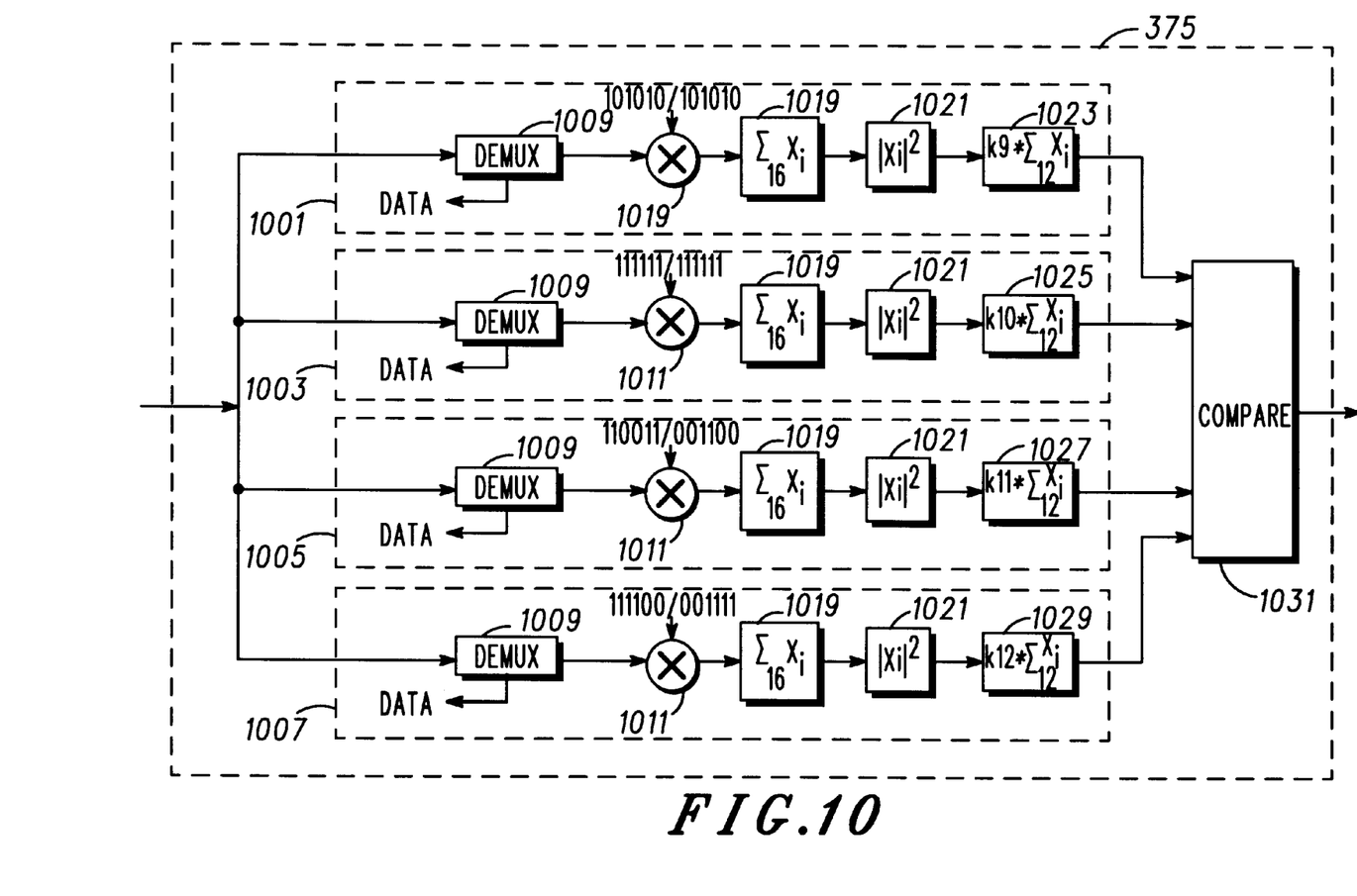
FIG. 10 is a block diagram of the rate computer of FIG. 3 in accordance with a third preferred embodiment of the present invention.

FIG. 10 is a block diagram of the rate computer of FIG. 3 in accordance with a third preferred embodiment of the present invention. In the third embodiment, rate computer 375 is utilized when a RC-type modulation occurs utilizing a continuous reverse link transmission and the transmission rate is modulated onto the transmission of the reference bits. Operation of rate computer 375 in accordance with the third embodiment of the present invention occurs as follows: Complex data and reference symbol samples enter rate computer 375 and are directed to four separate branches 1001–1007. As discussed above, there exists one branch for each possible transmission rate that outputs a level indicating the probability of particular transmission rate being utilized. The samples are then de-multiplexed by demultiplexer 1009 where the data is stripped from the reference symbols. The reference symbols are then output from demultiplexer 1009 and enter mixing circuit 1011 where they are multiplied by a predetermined value. In the preferred embodiment, each branch 1001–1007 has an appropriate predetermined value corresponding to the modulation scheme used for that rate. For example, in the preferred embodiment, full rate branch 1001 utilizes "101010101010" to mix with the output of demultiplexer 1009.

The mixed samples are then summed 16 at a time by circuitry 1019 and passed to circuitry 1021 where the summed mixed samples are magnitude squared. An alternative to the block sum circuitry 1019 is to do a running sum of the last (16+4*N) samples, where N is a integer proportional to the radio channel correlation time, and pass an intermediate result every 4 samples. The values are then passed to the appropriate summer/scaler 1023–1029 where it is added to the previous values and scaled. The resulting scaled value and all intermediate scaled values are passed to comparator 1031 where (as discussed above) the largest value passed corresponds to the particular transmission rate being utilized.

Figure 11:
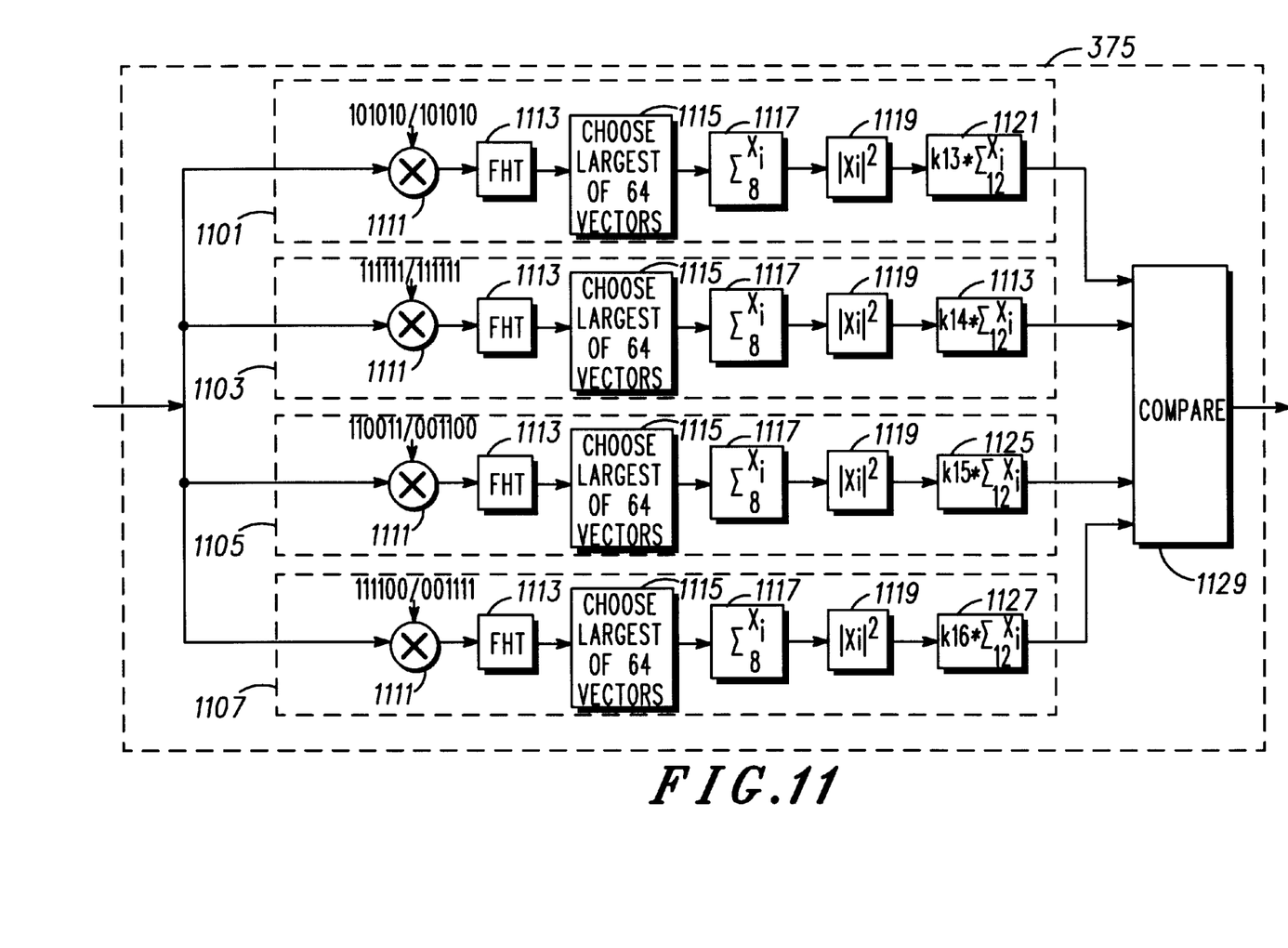
FIG. 11 is a block diagram of the rate computer of FIG. 3 in accordance with a fourth preferred embodiment of the present invention.

FIG. 11 is a block diagram of the rate computer of FIG. 3 in accordance with a fourth preferred embodiment of the present invention. In the fourth embodiment, rate computer 375 is utilized when M-ary modulation occurs utilizing a continuous reverse link transmission and the transmission rate is modulated onto the Walsh code transmission (i.e. Walsh code polarity). Operation of rate computer 375 in accordance with the fourth embodiment of the present invention occurs as follows: Complex symbol samples of the 64 symbol orthogonal code enter rate computer 375 and are directed to four separate branches 1101–1107. The samples enter mixing circuit 1111 where they are multiplied at the orthogonal symbol rate by a predetermined value. In the preferred embodiment, each branch 1101–1107 has an appropriate value corresponding to the modulation scheme used. For example, in the preferred embodiment, full rate branch 1101 utilizes "101010101010" to mix with the sample input where a "1" indicates no change and a "0" indicates a change in sign.

The mixed samples are then output to FHT 1113 where a transforming operation occurs. In particular, when 64 sample length groups are input, then 64 despread signals are generated. In addition, each transformer output signal has an associated Walsh index symbol which identifies each particular orthogonal code from within a set of mutually orthogonal codes (e.g. when 64 sample length groups are input, then a 6 bit length index data symbol can be associated with the transformer output signal to indicate the particular 64 bit length orthogonal code to which the transformer output signal corresponds). The output of FHT 1113 is two 1×64 matrices that indicate a probability of any Walsh code being transmitted. The largest of the 64 vectors is chosen at circuitry 1115 where its magnitude and phase are passed to summing circuitry 1117. Summing circuitry 1117 vector sums the output of circuitry 1115 8 at a time and passes the result on to magnitude squarer circuitry 1119. An alternative to the block sum circuitry 1117 is to do a running sum of the last (8*N) samples, where N is an integer proportional to the radio channel correlation time, and pass an intermediate result every 4 samples. An alternative to the phase estimating circuitry 1115 and 1117 is described by R. Walton and M. Wallace, "Near maximum likelihood demodulation for M-ary orthogonal signaling", Proceedings of VTC-93, pp 5–8. Finally the magnitude squared samples are passed to appropriate summer/scaler 1121–1127, where 12 samples are summed and scaled. The resulting value and all intermediate values are passed to comparator 1129 where (as discussed above) the largest value passed corresponds to the particular transmission rate being utilized. It should be noted that at the beginning of a frame, the contents of all summing circuits of FIGS. 8–11 are reset to zero.

The descriptions of the invention, the specific details, and the drawings mentioned above, are not meant to limit the scope of the present invention. For example, combinations of rate computer 375 are possible. In particular, the orthogonal symbol repetition method illustrated in FIG. 8 may be combined with the orthogonal symbol modulation method of FIG. 11 by adding the output of branches 801–807 to the weighted output of branches 1101–1107 respectively prior to performing the comparison. In a similar way the RC-type modulation data symbol repetition method of FIG. 9 may be combined with the RC-type reference bit modulation method of FIG. 10 by adding the output of branches 901–907 to the weighted output of branches 1001–1007 respectively prior to performing the comparison 931. In addition, the difference in received power between the beginning of the present frame and the end of the previous frame as described above may be combined with any of the others. It is the intent of the inventors that various modifications can be made to the present invention without varying from the spirit and scope of the invention, and it is intended that all such modifications come within the scope of the following claims.

What is claimed is:

1. A method for transmitting a transmission rate in a multi-rate communication system where a continuous transmission scheme is utilized for sub-rate transmission, the transmission scheme utilizing frames for transmitting data where each of the frames is transmitted at a particular transmission rate, the method comprising the steps of:

receiving traffic channel data output by a voice encoder;

orthogonally encoding the traffic channel data by M-ary modulating the traffic channel data with a plurality of spreading codes;

determining a transmission rate for a plurality of frames to be transmitted between a first communication unit and a second communication unit; and transmitting the plurality of frames from the first communication unit to the second communication unit along with a low-rate control channel, wherein the low-rate control channel is modulated onto a normally transmitted channel and is utilized to indicate the transmission rate for the plurality of frames;

wherein the step of transmitting the low-rate control channel from the first communication unit to the second communication unit comprises transmitting the low-rate control channel by modulating the transmission rate onto the polarity of a plurality of spreading codes used to modulate the traffic channel data output by the voice encoder, or by modulating the reference symbols utilized by a receiver to help in coherent demodulation of the orthogonally encoded traffic channel data.

2. The method of claim 1 further comprising the step of advancing a transmission of the low-rate control channel such that a transmission rate for a particular frame is transmitted during transmission of a previous frame.

3. The method of claim 1 further comprising the step of repeating a transmission of a first symbol when sub-rate transmission takes place.

4. The method of claim 3 wherein the step of repeating further comprises the step of repeating transmission of a first symbol such that the repeated symbol is a next symbol to be transmitted after transmission of the first symbol.

5. A method for transmitting a transmission rate in a multi-rate communication system where a continuous transmission scheme is utilized for sub-rate transmission, wherein the continuous transmission scheme repeats a transmission of a first symbol for sub-rate transmission such that the repeated symbol is a next symbol to be transmitted after transmission of the first symbol, the continuous transmission scheme utilizing frames for transmitting data where each of the frames is transmitted at a particular transmission rate, the method comprising the steps of:

receiving traffic channel data representative of voice or data that is to be transmitted;

orthogonally encoding the traffic channel data by M-ary modulating the traffic channel data with a plurality of spreading codes;

determining a transmission rate for a plurality of frames to be transmitted between a first communication unit and a second communication unit;

modulating the transmission rate onto the plurality of frames by spreading the traffic channel data to be transmitted with either a spreading code or its inverse such that a sequence of spread data is utilized to indicate the transmission rate; and transmitting the spread data indicating the transmission rate from the first communication unit to the second communication unit.

6. The method of claim 5 wherein the step of transmitting the spread data indicating the transmission rate further comprises the step of transmitting the spread data such that a transmission rate for a particular frame is transmitted during transmission of a previous frame.

7. The method of claim 5 wherein the step of transmitting the spread data indicating the transmission rate further comprises the step of transmitting the spread data indicating the transmission rate by transmitting a message from a group consisting of change in transmission rate and no change in transmission rate.

8. The method of claim 5 wherein the step of transmitting the spread data indicating the transmission rate further comprises the step of transmitting the spread data indicating the transmission rate by transmitting a message from a group consisting of increase in transmission rate, same transmission rate, and decrease in transmisison rate.

9. The method of claim 5 wherein the step of transmitting the spread data indicating the transmission rate further comprises the step of transmitting the spread data indicating the transmission rate by transmitting a message from a group consisting of full rate transmission, ½ rate transmission, ¼ rate transmission, and ⅛ rate transmission.

10. A method for determining a transmission rate in a multi-rate communication system where a continuous transmission scheme is utilized for sub-rate reverse-channel transmission, the transmission scheme utilizing frames for transmitting data where each of the frames is transmitted at a particular transmission rate, the method comprising the steps of:

receiving a plurality of traffic channel data frames output from a first vocoder from a first communication unit along with a low-rate control channel, wherein the low-rate control channel is modulated onto a normally transmitted channel and is utilized to indicate the transmission rate for the plurality of frames; and determining a transmission rate for the plurality of frames from the low-rate control channel;

wherein the step of receiving the low-rate control channel comprises the step of receiving the low-rate control channel from the first communication unit wherein the low-rate control channel is formed by modulating the transmission rate onto a polarity of a plurality of spreading codes used to modulate the traffic channel data output by the voice encoder, or by modulating the transmission rate by modulating the reference symbols utilized by a receiver to help in coherent demodulation of the orthogonally encoded traffic channel data.

11. The method of claim 10 further comprising the step of receiving the low-rate control channel such that a transmission rate for a particular frame is received during transmission of a previous frame.

12. A method for receiving a transmission rate in a multi-rate communication system where a continuous transmission scheme is utilized for sub-rate reverse-channel transmission, wherein the continuous transmission scheme repeats a transmission of a first symbol for sub-rate transmission such that the repeated symbol is a next symbol to be transmitted after transmission of the first symbol, the continuous transmission scheme utilizing frames for transmitting data where each of the frames is transmitted at a particular transmission rate, the method comprising the steps of:

receiving spread data indicating the transmission rate from a first communication unit wherein the spread data is received with either a spreading code or its inverse such that a sequence of spread data is utilized to indicate the transmission rate; and determining the transmission rate for a plurality of frames from the sequence of spread data.

13. An apparatus for transmitting a transmission rate in a multi-rate communication system where a continuous transmission scheme is utilized for sub-rate transmission, the continuous transmission scheme utilizing frames for transmitting data where each of the frames is transmitted at a particular transmission rate, the apparatus comprising:

an encoder having data as an input and outputting the transmission rate for a plurality of frames to be transmitted between a first communication unit and a second communication unit;

an instantaneous traffic channel gain computer having the plurality of frames and the transmission rate as inputs and outputting a plurality of frames with the transmission rate modulated thereon by spreading the plurality of frames with either a spreading code or its inverse such that a sequence of spread data is utilized to indicate the transmission rate; and a transmitter having as an input, the plurality of frames with the transmission rate modulated thereon, and transmitting the plurality of frames from the first communication unit to the second communication unit.

14. An apparatus for transmitting a transmission rate in a multi-rate communication system where a continuous transmission scheme is utilized for sub-rate transmission, the continuous transmission scheme utilizing frames for transmitting data where each of the frames is transmitted at a particular transmission rate, the apparatus comprising:

an encoder having data as an input and outputting the transmission rate for a plurality of frames to be transmitted between a first communication unit and a second communication unit;

an instantaneous traffic channel gain computer having the plurality of frames and the transmission rate as inputs and outputting a plurality of frames with reference symbols interspersed among interleaved frames, the reference symbols additionally having the transmission rate modulated thereon by varying the reference symbols such that a sequence of reference symbols is utilized to indicate the transmission rate wherein the reference symbols are additionally utilized by a receiver to help in synchronization; and a transmitter having as an input, the plurality of frames with the transmission rate modulated thereon, and transmitting the plurality of frames from the first communication unit to the second communication unit.

15. An apparatus for receiving a transmission rate in a multi-rate communication system where a continuous transmission scheme is utilized for sub-rate reverse-channel transmission, the continuous transmission scheme utilizing frames for transmitting data where each of the frames is transmitted at a particular transmission rate, the apparatus comprising:

a receiver having as an input, a plurality of frames with the transmission rate modulated thereon such that the plurality of frames are spread with either a spreading code or its inverse to produce a sequence of spread data, wherein the sequence of spread data is utilized to indicate the transmission rate, the receiver outputting the plurality of frames; and a rate computer having the plurality of frames as an input and outputting the transmission rate.

16. An apparatus for receiving a transmission rate in a multi-rate communication system where a continuous transmission scheme is utilized for sub-rate reverse-channel transmission, the continuous transmission scheme utilizing frames for transmitting data where each of the frames is transmitted at a particular transmission rate, the apparatus comprising:

a receiver having as an input, a plurality of frames with the transmission rate modulated thereon such that the plurality of frames comprises reference symbols interspersed among interleaved frames wherein the reference symbols are utilized by a receiver to help in synchronization, the reference symbols additionally having the transmission rate modulated thereon by varying the reference symbols such that a sequence of reference symbols is utilized to indicate the transmission rate, the receiver outputting the plurality of frames; and a rate computer having the plurality of frames as an input and outputting the transmission rate.

* * * * *